Figure 1:
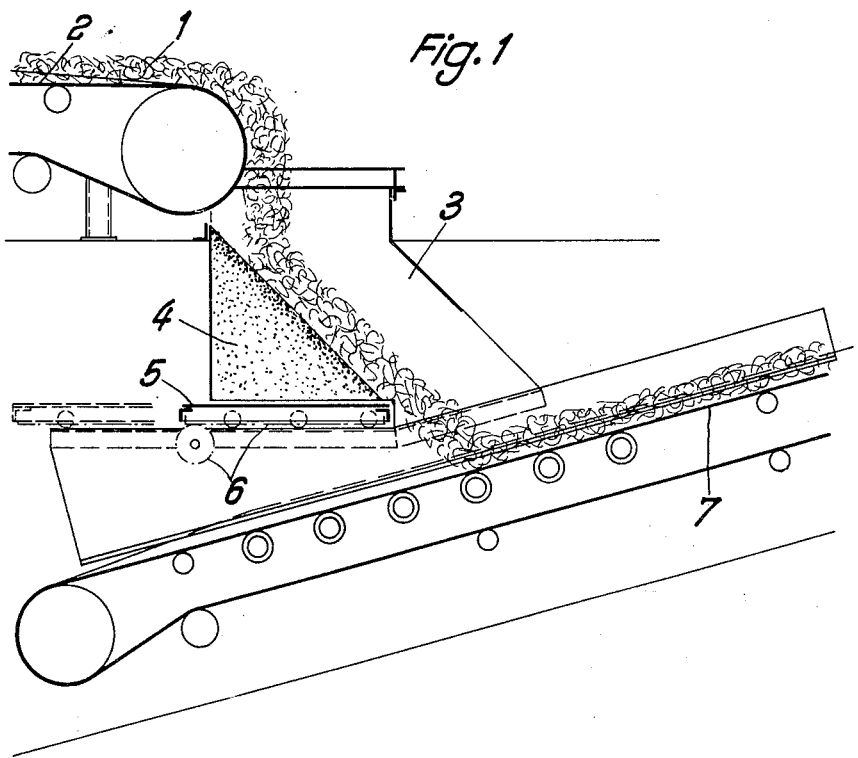

Oct. 9, 1962 H. FRASCH ET AL 3,057,454
DEVICE FOR DIRECTING MATERIAL FROM ONE CONVEYER BELT TO ANOTHER
Filed March 12, 1959 6 Sheets-Sheet 1

Inventors:
Harald Frasch
Emil Kuwertz
BY Michael S. Striker
Attorney

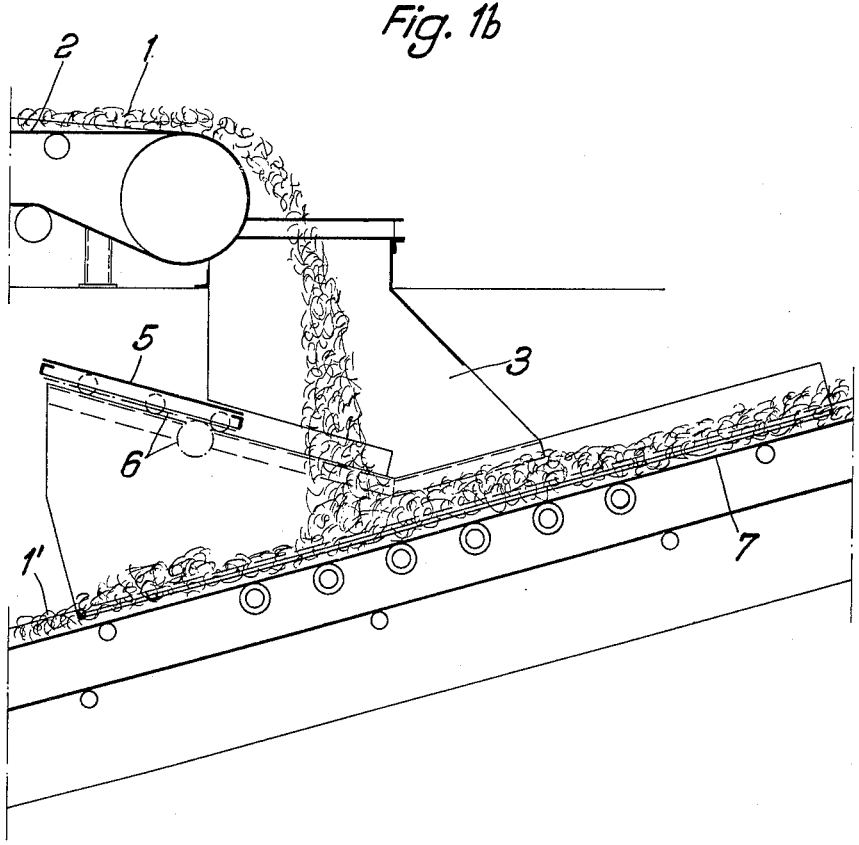

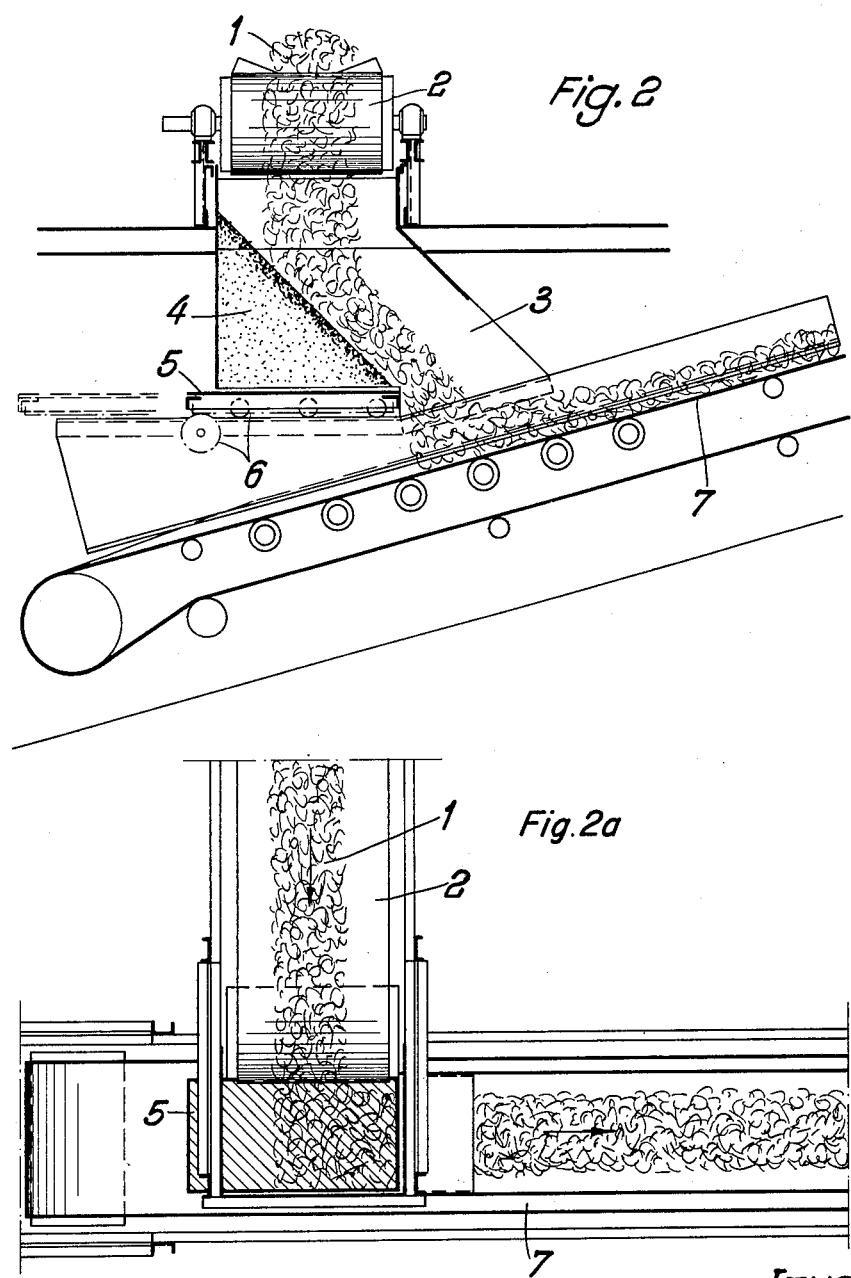

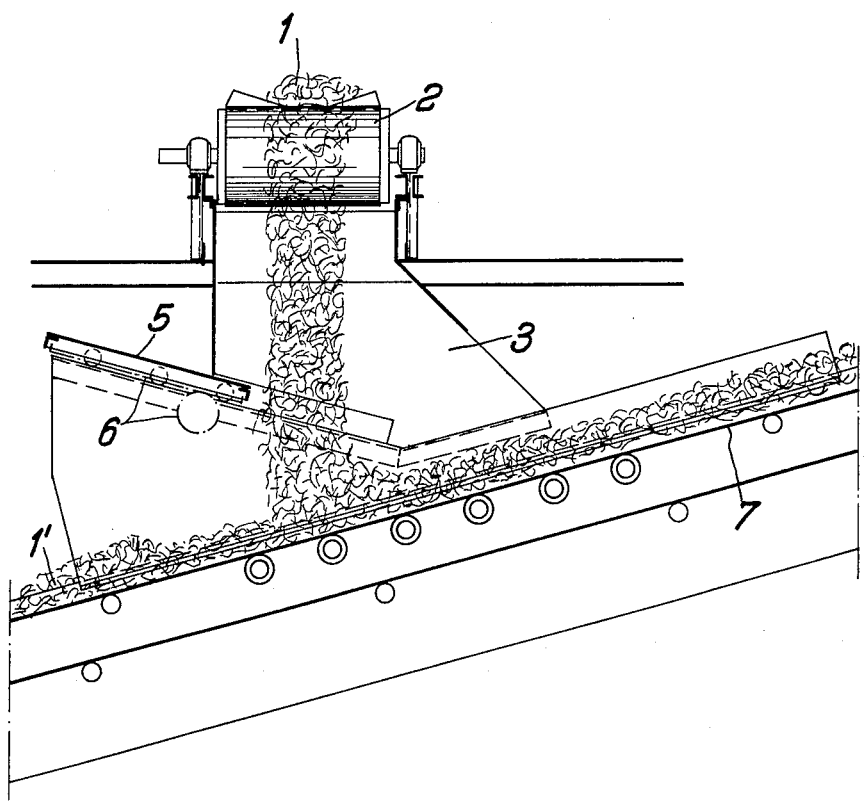

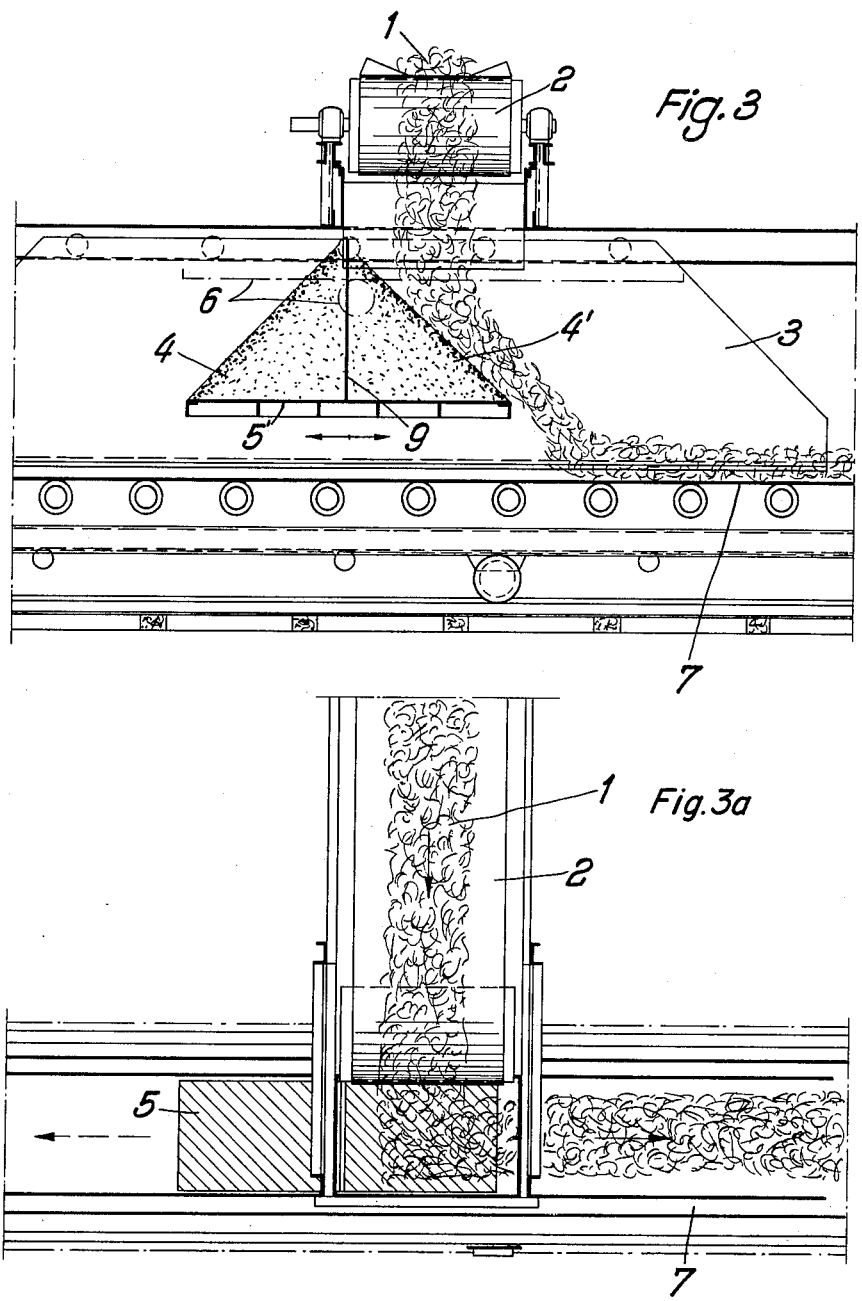

Oct. 9, 1962 H. FRASCH ET AL 3,057,454
DEVICE FOR DIRECTING MATERIAL FROM ONE CONVEYER BELT TO ANOTHER
Filed March 12, 1959 6 Sheets-Sheet 6
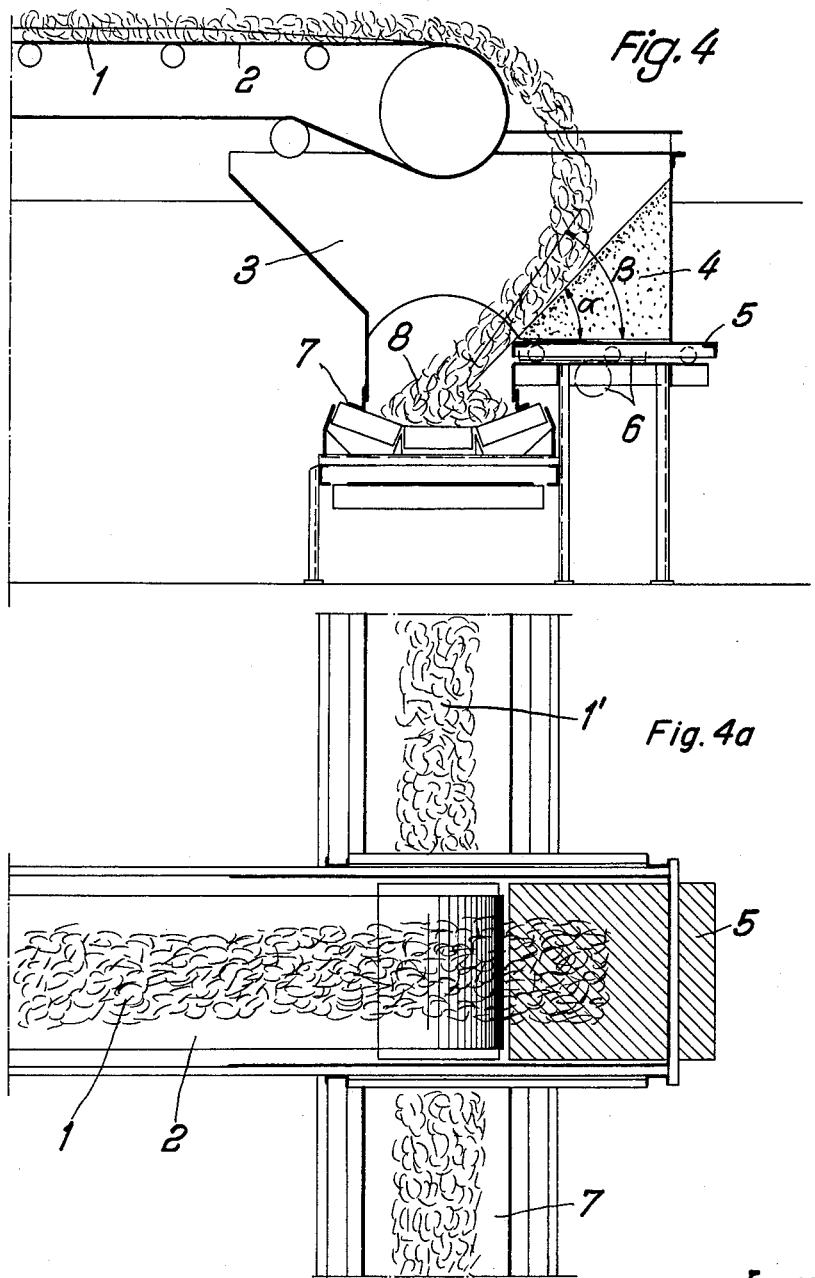
Inventors:
Harald Frasch
Erich Kuwertz
BY Michael S. Stirka
Attorney United States Patent Office 3,057,454
Patented Oct. 9, 1962

3,057,454
DEVICE FOR DIRECTING MATERIAL FROM ONE CONVEYOR BELT TO ANOTHER
Harald Frasch and Erich Kuwertz, Bremen, Germany, assignors to Klockner-Hutte Bremen AG., Bremen, Germany
Filed Mar. 12, 1959, Ser. No. 798,977
Claims priority, application Germany Mar. 13, 1958
10 Claims. (Cl. 198—45)

The present invention relates to material handling apparatus.

More particularly, the present invention relates to conveyer belt systems which convey particulate material such as lumps or ore or even granular material of relatively small size. With conveyer belt systems of this type, when the material flows from one belt to another, various difficulties occur with respect to the efficient transfer of the material, particularly when a change-over is made from one type of material to another and particularly in those cases where the material may include components such as clay or other sticky components so as to cause the different lumps or particles of material to undesirably cling to each other. Furthermore, when the material is deposited on a belt, which already carries other material, stoppage often occurs because of the relative thickness of the layers of material. Also, while it is always desirable to direct the material onto a central portion of a moving belt, this is not always possible and it sometimes happens that the material falls adjacent to an edge of the belt and eventually spills over the side of the belt.

One of the objects of the present invention is to provide in a conveyer system of the above type a device which will efficiently provide for the transfer of the material from one conveyer belt to another irrespective of the angle between the belts or the direction of movement thereof.

It is also an object of the present invention to provide a device of the above type which is capable of being adjusted so as to take into account the properties of the material which is being transported.

A further object of the present invention is to provide a structure which is capable of being adjusted to direct the material at all times onto the center of a receiving conveyer belt.

An additional object of the present invention is to provide a device of the above type which is capable of being used with a reversible belt and being adjusted so as to cooperate properly with a reversible belt irrespective of the direction in which the latter moves.

Also, it is an object of the present invention to provide a device of the above type which can be so adjusted that it is impossible for stoppage to occur.

With the above objects in view, the present invention includes in a conveyer apparatus of the above type upper and lower belts with the discharge end of the upper belt located over the lower belt. A pocket means is located between the upper and lower belts in the path of material flow from the discharge end of the upper belt to receive material from the discharge end of the upper belt, this pocket means having a rear wall and a bottom wall between which the material collects so that the material itself forms an inclined surface along which the material flows down to the lower belt. A chute means cooperates with the lower belt and houses the pocket means to cooperate also with the latter for directing material which flows laterally beyond the pocket means reliably onto the lower belt. In accordance with the present invention the pocket means is adjustable so as to take care of all of the different conditions which occur during operation with different types of material.

Figure 1A:
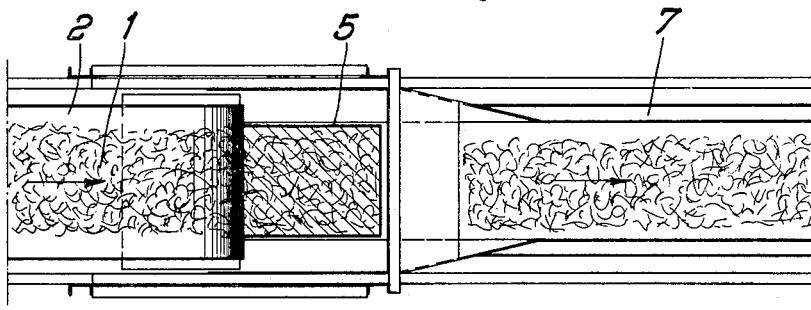

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a side elevational view of one embodiment of a structure according to the present invention;
FIG. 1a is a plan view of the embodiment shown in FIG. 1;
FIG. 1b shows a variation of the structure of FIG. 1;
FIG. 2 is an elevation view of another embodiment of the present invention;
FIG. 2a is a plan view of the embodiment shown in FIG. 2;
FIG. 2b shows a variation of the structure of FIG. 2;
FIG. 3 is an elevation view of a further embodiment of the present invention; and
FIG. 3a is a plan view of the embodiment shown in FIG. 3;
FIG. 4 is an elevation and plan view of yet another embodiment, FIG. 4 illustrating the manner in which the structure of the invention can be adjusted to produce different results; and
FIG. 4a is a plan view of the embodiment shown in FIG. 4.

Referring now to FIG. 1, the material 1 which is transported is conveyed by the upper belt 2 to the discharge end of the latter which is shown in FIG. 1. From the discharge end of the upper belt 2 the material 1 falls downwardly toward a pocket means 4 constructed according to the present invention. This pocket means includes a substantially vertical rear wall which in the example illustrated in FIG. 1 is stationary and is fixedly carried by the frame work which supports the conveyer belts.

The pocket means 4 also includes a bottom wall 5 which in accordance with the present invention is shiftable in the example of FIG. 1, although, if desired, the entire pocket means 4 could be shiftable in its entirety. The material which falls from the discharge end of the conveyer belt 2 collects in the pocket means 4 and the material itself forms an inclined surface along which the material flows down to the lower belt 7 shown in FIG. 1, the discharge end of the upper belt 2 being located over the lower belt 7 with the pocket means 4 located between the upper and lower belts in the path of material flow from the upper to the lower belt, as shown in FIG. 1. Of course, the inclination of the surface of the material which collects in the pocket means 4 depends upon the properties of the material itself, and this inclination is not always the best possible inclination. By providing a bottom wall 5 which is adjustable, in accordance with the present invention, the inclination of the material in the pocket means 4 can be regulated. For this purpose the bottom wall 5 fixedly carries a rack which meshes with a pinion, this rack and pinion forming an adjusting means operable in any suitable way for shifting the bottom wall 5 so as to adjust the pocket means 4 in this manner. For example, an electric motor may be connected to a suitable transmission with the pinion 6 so as to rotate the latter in one direction or the other depending upon the operation of a suitable switch located distant from the structure shown in FIG. 1. In this way it is possible for the operator to control the flow of material from the upper belt to the lower belt, and the nature of the flow is not controlled entirely by the properties of the material itself. It thus becomes possible to handle sticky materials and to switch from one type of material to another without any difficulties. As may be seen from FIG. 1, the pocket means 4 is housed within a chute means 3 which has a pair of opposed stationary side walls between which the pocket means 4 is located, and these side walls which form the chute means 3 are also fixedly carried by the frame work which supports the conveyer belts 2 and 7. As may be seen from the plan view of FIG. 1, the chute means is located laterally beyond the pocket means and narrows toward the lower belt 7 so that any material which happens to fall laterallly beyond the pocket means will be reliably directed by the chute means 3 onto the lower belt 7.

The structure which is illustrated in FIG. 1a is the same as that of FIG. 1 except that the bottom wall 5 is inclined downwardly toward the lower conveyer belt 7 in the manner illustrated in FIG. 1a. In certain cases the lower conveyer belt 7 already carries material 1' onto which the material 1 from the upper conveyer belt 2 is deposited. In such a case with the embodiment of FIG. 1 is could happen, particularly where there are very large chunks of material 1' that the material will become blocked between the lower belt and the right end of the bottom wall 5 of the pocket means 4. In order to avoid such an undesirable result, the structure of FIG. 1a is capable of being actuated through the adjusting means 6 which has the same construction as the adjusting means 6 of FIG. 1 so as to shift the bottom wall 5 to the left, as viewed in FIG. 1a, and thus avoid any stoppage.

It should be noted that the pocket means 4 of FIGS. 1 and 1a includes a pair of triangular side walls extending forwardly from and fixed to the rear wall of the pocket means 4 as by being formed integrally with this rear wall.

FIG. 2 illustrates an arrangement where the lower belt 7 extends perpendicularly with respect to the upper belt 2. It will be noted that the structure of the invention used with this arrangement of conveyer belts is identical with that of FIG. 1 except that the chute means 3 is constructed at its top end so as to cooperate with the discharge end of the belt 2 which extends perpendicularly with respect to the lower belt 7. It will be noted that the pocket means 4 as well as the bottom wall 5 and the adjusting means 6 cooperate in the same way with respect to the bottom belt 7.

FIG. 2a shows a pair of conveyer belts arranged at right angles with respect to each other where the lower belt carries material 1' onto which material of the upper belt is deposited, and in this case the bottom wall 5 of the pocket means is inclined in the same way as in the embodiment of FIG. 1a described above so as to avoid stoppage in this case also.

The embodiment of FIG. 3 illustrates an arrangement where the lower belt not only extends perpendicularly with respect to the upper belt but also is reversible so that the material dropping from the upper belt 2 may be conveyed in either direction as indicated by the double arrow. With this arrangement the pocket means includes a rear wall 9 and the bottom wall 5' extends in both directions from the rear wall so as to provide a pair of pocket portions 4 and 4', as indicated in FIG. 3. The rear wall 9 and the bottom wall 5' are in this case fixed directly to the chute means 3 which is itself supported for shifting movement to the right or left, as viewed in FIG. 3, and the rack and pinion means 6 is connected with the chute means 3 to adjust the latter together with the pocket means so that in this case the entire assembly is shiftable along the lower belt 7 of FIG. 3. The rack is fixed to the chute means 3 and the pinion 6 cooperates with this rack. In the position of the part shown in FIG. 3 the belt 7 has its upper run moving to the right, while where the direction of the belt 7 is reversed the entire assembly of chute means and pocket means plus adjusting means would be actuated so as to be shifted to the right, as viewed in FIG. 3, in order to direct the material to the left.

Referring now to FIG. 4, it will be seen that in this case the pocket means 4 is arranged so that the material collected therein forms a surface inclined at the angle α so that the material will fall to the center of the lower belt 7. It will be noted that with the embodiment of FIG. 4 the pocket means is arranged so that its rear wall faces the discharge end of the upper belt 2, but otherwise the embodiment of FIG. 4 is identical with that of FIGS. 2 and 2a.

When the properties of the transported material change, then the inclined surface of the material which collects in the pocket means 4 will also change, and as a result instead of the material being directed toward the center of the lower belt 7, it will be directed undesirably toward one side of the belt to provide uneven wear of the belt and to also spill over the side of the belt. In order to avoid such an undesirable result, the adjusting means 6 can be actuated so as to shift the bottom wall 5 from the solid to the dotted line position shown in FIG. 4, for example, so that in this case even though the material changes and provides a different inclined surface, nevertheless the angle β can be provided to guarantee that the material will be directed to the center of the belt, as indicated in FIG. 4.

It will be understood that each of the elements described above, or two or more together, may also find a useful application in other types of conveyers differing from the types described above.

While the invention has been illustrated and described as embodied in belt conveyers, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a material transporting apparatus, in combination, upper and lower conveyer belts, said upper belt having a discharge end located over said lower belt; pocket means located in the path of material flow from said discharge end of said upper belt for receiving material therefrom, said pocket means being arranged between the discharge end of said upper belt and said lower belt and said pocket means having a rear wall and a bottom wall between which the material collects so that the material itself forms an inclined surface directed downwardly toward the lower belt and along which the material flows from the discharge end of the upper belt to the lower belt; chute means in which said pocket means is located, said chute means cooperating with said pocket means and said lower belt for directing material which flows laterally beyond said pocket means onto said lower belt, said chute means having an open bottom end and said bottom wall having a free end located within said open bottom end; and adjusting means cooperating with said pocket means for adjusting the latter with respect to said belts so as to properly transfer particulated material of different size and different coefficient of friction from the upper to the lower belt.

2. In a material transporting apparatus, in combination, upper and lower conveyer belts, said upper belt having a discharge end located over said lower belt; pocket means located in the path of material flow from said discharge end of said upper belt for receiving material therefrom, said pocket means being arranged between the discharge end of said upper belt and said lower belt and said pocket means having a rear wall and a bottom wall between which the material collects so that the material itself forms an inclined surface directed downwardly toward the lower belt and along which the material flows from the discharge end of the upper belt to the lower belt; chute means in which said pocket means is located, said chute means cooperating with said pocket means and said lower belt for directing material which flows laterally beyond said pocket means onto said lower belt, said chute means having an open bottom end and said bottom wall having a free end located within said open bottom end; and adjusting means cooperating with said pocket means for adjusting the latter with respect to said belts, said pocket means and chute means being fixed to each other and said adjusting means moving said pocket means and chute means together as a unit so as to properly transfer particulated material of different size and different coefficient of friction from the upper to the lower belt.

3. In a material transporting apparatus, in combination, upper and lower conveyer belts, said upper belt having a discharge end located over said lower belt; pocket means located in the path of material flow from said discharge end of said upper belt for receiving material therefrom, said pocket means being arranged between the discharge end of said upper belt and said lower belt and said pocket means having a rear wall and a bottom wall between which the material collects so that the material itself forms an inclined surface directed downwardly toward the lower belt and along which the material flows from the discharge end of the upper belt to the lower belt; chute means in which said pocket means is located, said chute means cooperating with said pocket means and said lower belt for directing material which flows laterally beyond said pocket means onto said lower belt, said chute means having an open bottom end and said bottom wall having a free end located within said open bottom end; and adjusting means cooperating with said pocket means for adjusting the latter with respect to said belts, said bottom wall of said pocket means being movable with respect to said rear wall thereof and said adjusting means cooperating with said bottom wall for moving the latter with respect to said rear wall so as to properly transfer particulated material of different size and different coefficient of friction from the upper to the lower belt.

4. In a material transporting apparatus, in combination, upper and lower conveyer belts, said upper belt having a discharge end located over said lower belt; pocket means located in the path of material flow from said discharge end of said upper belt for receiving material therefrom said pocket means being arranged between the discharge end of said upper belt and said lower belt and said pocket means having a rear wall and a bottom wall between which the material collects so that the material itself forms an inclined surface directed downwardly toward the lower belt and along which the material flows from the discharge end of the upper belt to the lower belt; chute means in which said pocket means is located, said chute means cooperating with said pocket means and said lower belt for directing material which flows laterally beyond said pocket means onto said lower belt; and adjusting means cooperating with said pocket means for adjusting the latter with respect to said belts, said pocket means and chute means being fixed to each other and said adjusting means moving said pocket means and chute means together as a unit, said pocket means having its rear wall fixed to said chute means and located between the ends of said bottom wall, the latter extending in both directions beyond the bottom end of said rear wall and also being fixed to said chute means so that said pocket means includes a pair of pocket portions respectively located on opposite sides of said rear wall and said rear wall being common to both of said pocket portions, and said adjusting means cooperating with said chute means for moving the latter together with said pocket means so that said chute means and pocket means may be shifted in one direction or the other to provide cooperation between one pocket portion or the other with said lower belt depending upon the direction of movement of the latter.

5. In a material transporting apparatus, in combination, upper and lower belts, said upper belt having a discharge end located over said lower belt; pocket means located in the path of material flow from said discharge end of said upper belt to receive material therefrom and to direct the material onto said lower belt, said pocket means having a rear wall one face of which is directed in the direction of material flow toward said lower belt, and said pocket means having a bottom wall extending beyond said face of said rear wall in the direction of material flow toward said lower belt and having a free end distant from said one face of said rear wall on the side thereof facing in the direction of material flow toward said lower belt; adjusting means cooperating with said bottom wall of said pocket means for shifting the latter with respect to said rear wall to adjust the distance of said free end of said bottom wall from said face of said rear wall, whereby the inclination of a surface of material which collects in said pocket means and along which the material flows down to said lower belt can be regulated; and chute means cooperating with said lower belt and in which said pocket means is located for directing the material which flows laterally from said pocket means onto said lower belt, said chute means having an open bottom end and said free end of said bottom wall being located within said open end of said chute means.

6. In a material transporting apparatus, in combination, upper and lower belts, said upper belt having a discharge end located over said lower belt; pocket means located in the path of material flow from said discharge end of said upper belt to receive material therefrom and to direct the material onto said lower belt, said pocket means having a rear wall one face of which is directed in the direction of material flow toward said lower belt, and said pocket means having a bottom wall extending beyond said face of said rear wall in the direction of material flow toward said lower belt and having a free end distant from said one face of said rear wall on the side thereof facing in the direction of material flow toward said lower belt; adjusting means cooperating with said bottom wall of said pocket means for shifting the latter with respect to said rear wall to adjust the distance of said free end of said bottom wall from said face of said rear wall, whereby the inclination of a surface of material which collects in said pocket means and along which the material flows down to said lower belt can be regulated; and chute means cooperating with said lower belt and in which said pocket means is located for directing the material which flows laterally from said pocket means onto said lower belt, said chute means having an open bottom end and said free end of said bottom wall being located within said open end of said cute means, said bottom wall being located in a plane inclined to vertical and horizontal planes and said adjusting means when shifting said bottom wall changing the distance between the free end of said bottom wall and said lower belt so that there will be no obstruction of material between the free end of said bottom wall and said lower belt.

7. In a material transporting apparatus, in combination, upper and lower conveyor belts, said upper belt having a discharge end located over said lower belt; pocket means located in the path of material flow from said discharge end of said upper belt for receiving material therefrom, said pocket means being arranged between the discharge end of said upper belt and said lower belt and said pocket means having a rear wall and a bottom wall between which the material collects so that the material itself forms an inclined surface directed downwardly toward the lower belt and along which the material flows from the discharge end of the upper belt to the lower belt; chute means in which said pocket means is located, said chute means cooperating with said pocket means and said lower belt for directing material which flows laterally beyond said pocket means onto said lower belt, said chute means having an open bottom end and said bottom wall having a free end located within said open bottom end; adjusting means cooperating with said pocket means for adjusting the latter with respect to said belts so as to properly transfer particulated material of different size and different coefficient of friction from the upper to the lower belt and means located at a distance from said pocket means and cooperating with said adjusting means for actuating the latter to adjust said pocket means.

8. In a material transporting apparatus, in combination, upper and lower conveyor belts, said upper belt having a discharge end located over said lower belt and said lower belt extending in a direction transverse to the direction of said upper belt; pocket means located in the path of material flow from said discharge end of said upper belt for receiving material therefrom, said pocket means being arranged between the discharge end of said upper belt and said lower belt and said pocket means having a rear wall and a bottom wall between which the material collects so that the material itself forms an inclined surface directed toward said lower belt and along which the material flows from the discharge end of said upper belt to said lower belt, said rear wall facing said discharge end and said bottom wall having a front edge substantially parallel to the direction of said lower belt and being movable with respect to said rear wall from a position in which said front edge is located nearer to a position in which said front edge is located farther from said rear wall; chute means in which said pocket means is located, said chute means cooperating with said pocket means and said lower belt for directing material which flows laterally beyond said pocket means onto said lower belt, said chute means having an open bottom end and said front edge of said bottom wall being located within said open bottom end of said chute means; and adjusting means cooperating with said bottom wall of said pocket means for adjusting the same between said positions thereof, whereby when different materials having a different angle of repose are transported by the transporting apparatus, the position of said bottom wall may be adjusted in such a manner that the material sliding down said inclined surface at the respective angle of repose will be directed substantially to the center of said lower belt.

9. In a material transporting apparatus, in combination, upper and lower conveyor belts, said upper belt having a discharge end located over said lower belt; pocket means located in the path of material flow from said discharge end of said upper belt for receiving material therefrom, said pocket means being arranged between the discharge end of said upper belt and said lower belt and said pocket means having a rear wall and a bottom wall between which the material collects so that the material itself forms an inclined surface directed downwardly toward the lower belt and along which the material flows from the discharge end of the upper belt to the lower belt; chute means having a pair of side walls between which said pocket means is located and having an open bottom end and said bottom wall having a free edge located within said open bottom end of said chute means, said chute means cooperating with said pocket means and said lower belt for directing material which flows laterally beyond said pocket means onto said lower belt; roller means supporting at least said bottom wall of said pocket means for movement in direction of said side walls of said chute means; and adjusting means cooperating with said pocket means for adjusting the latter with respect to said belts.

10. An arrangement as defined in claim 9 in which said adjustment means include a rack connected to said pocket means and a pinion cooperating with the rack.

References Cited in the file of this patent
UNITED STATES PATENTS

| | | |
|---|---|---|
| 804,022 | May | Nov. 7, 1905 |
| 1,288,832 | Carr | Dec. 24, 1918 |
| 2,699,248 | Shabaker | Jan. 11, 1955 |
| 2,785,683 | Davidson | Mar. 19, 1957 |

FOREIGN PATENTS

| | | |
|---|---|---|
| 569,475 | Germany | Feb. 20, 1933 |
| 568,338 | Italy | Oct. 28, 1957 |